United States Patent
Ha et al.

(10) Patent No.: US 11,209,913 B2
(45) Date of Patent: *Dec. 28, 2021

(54) USER ACTION REMOTE CONTROL

(71) Applicant: Computime, Ltd., Wanchai (HK)

(72) Inventors: Wai-Leung Ha, Hong Kong (HK); Kairy Kai Lei, Shen Zhen (CN); Gordon Qian, Shen Zhen (CN)

(73) Assignee: Computime Ltd., New Territories (HK)

( * ) Notice: Subject to any disclaimer, the term of this patent is extended or adjusted under 35 U.S.C. 154(b) by 1004 days.

This patent is subject to a terminal disclaimer.

(21) Appl. No.: 15/370,777

(22) Filed: Dec. 6, 2016

(65) Prior Publication Data

US 2017/0123515 A1    May 4, 2017

Related U.S. Application Data

(63) Continuation of application No. 12/051,618, filed on Mar. 19, 2008, now Pat. No. 9,513,718.

(51) Int. Cl.
*G06F 3/048* (2013.01)
*G06F 3/0346* (2013.01)
(Continued)

(52) U.S. Cl.
CPC ............ *G06F 3/0346* (2013.01); *G06F 3/017* (2013.01); *G06F 3/038* (2013.01);
(Continued)

(58) Field of Classification Search
CPC ..... G06F 3/015; G06F 19/3462; G06F 3/0338
See application file for complete search history.

(56) References Cited

U.S. PATENT DOCUMENTS 6,812,881 B1 * 11/2004 Mullaly ................. G08C 17/02
340/12.53
6,831,664 B2 * 12/2004 Marmaropoulos ... G06F 3/0325
715/700
(Continued)

FOREIGN PATENT DOCUMENTS

CN    2565092 Y    8/2003
CN    1912948      2/2007
(Continued)

OTHER PUBLICATIONS

Jun. 25, 2009—(PCT) International Search Report—App. PCT/CN2009/070879.
(Continued)

*Primary Examiner* — Hua Lu
(74) *Attorney, Agent, or Firm* — Banner & Witcoff, Ltd.

(57) ABSTRACT

The present invention supports the control of a plurality of controlled devices. With three dimensional accelerometer components, detection of a user action on a remote controller and the orientation of the remote controller are viable through small electronic devices. Aspects of the invention are based on the three dimensional accelerometer components to provide a remote controller that can detect the user action. Based on the user action, the remote controller transmits a signal to the controlled device which conveys the corresponding command. A selected controlled device may be matched to the remote controller. The remote controller and controlled device may also support a learning mode, in which the controlled device sends a list of supported commands to the remote controller. The remote controller then matches an associated action with each command in the command list.

20 Claims, 7 Drawing Sheets

(51) Int. Cl.
*G06F 3/01* (2006.01)
*H04N 21/422* (2011.01)
*G06F 3/038* (2013.01)

(52) U.S. Cl.
CPC . *H04N 21/42204* (2013.01); *H04N 21/42208* (2013.01); *H04N 21/42222* (2013.01); *G08C 2201/10* (2013.01); *G08C 2201/32* (2013.01)

(56) References Cited

U.S. PATENT DOCUMENTS

| | | | |
|---|---|---|---|
| 7,102,616 B1* | 9/2006 | Sleator | H04N 21/42222 345/158 |
| 7,176,888 B2 | 2/2007 | Marvit et al. | |
| 7,777,649 B2* | 8/2010 | De Ruyter | G08C 17/00 341/20 |
| 8,154,514 B2* | 4/2012 | Seo | H04N 21/42204 345/158 |
| 2002/0068556 A1* | 6/2002 | Brown | G08C 17/02 455/420 |
| 2002/0142701 A1* | 10/2002 | Rosenberg | G05D 1/005 446/454 |
| 2003/0193572 A1 | 10/2003 | Wilson et al. | |
| 2004/0091236 A1* | 5/2004 | Boston | H04N 5/76 386/262 |
| 2004/0095317 A1 | 5/2004 | Zhang et al. | |
| 2005/0102699 A1 | 5/2005 | Kim et al. | |
| 2005/0212753 A1 | 9/2005 | Marvit et al. | |
| 2005/0231414 A1 | 10/2005 | Chu et al. | |
| 2006/0084409 A1 | 4/2006 | Ghadiali | |
| 2006/0241864 A1* | 10/2006 | Rosenberg | G08C 17/02 701/469 |
| 2007/0080846 A1* | 4/2007 | Stefanik | G08B 5/36 341/176 |
| 2007/0080940 A1 | 4/2007 | Aoki et al. | |
| 2007/0101356 A1 | 5/2007 | Walrath | |
| 2007/0130582 A1 | 6/2007 | Chang et al. | |
| 2007/0273583 A1 | 11/2007 | Rosenberg | |
| 2008/0141329 A1* | 6/2008 | Igoe | H04N 21/4307 725/141 |
| 2008/0174551 A1* | 7/2008 | Ishibashi | H04N 21/4223 345/158 |
| 2008/0247757 A1* | 10/2008 | Um | G08C 23/04 398/106 |
| 2008/0252491 A1* | 10/2008 | De Ruyter | G08C 17/00 341/20 |
| 2008/0291160 A1 | 11/2008 | Rabin | |
| 2009/0198354 A1* | 8/2009 | Wilson | G08C 17/00 700/90 |
| 2009/0213081 A1* | 8/2009 | Case, Jr. | G06F 1/1616 345/173 |
| 2009/0222452 A1 | 9/2009 | Bagg et al. | |
| 2010/0138798 A1* | 6/2010 | Wilson | A63F 13/428 715/863 |
| 2014/0368412 A1 | 12/2014 | Jacobsen et al. | |

FOREIGN PATENT DOCUMENTS

| | | |
|---|---|---|
| CN | 101150874 A | 3/2008 |
| CN | 1201150874 | 3/2008 |
| EP | 1335338 A2 | 8/2003 |
| JP | 2006324900 A | 11/2006 |

OTHER PUBLICATIONS

May 25, 2012—(GB) Further Examination Report—App. 1013374.2.

"F1 on the PS3—PSP in the RearView," Digital Displacement, May 9, 2006, pp. 1-2.

Wikipedia.org, "Remote Play," Mar. 13, 2008, http://en.wikipedia.org/w/index.php?title=Remote_Play&oldid=197747814.

Feb. 15, 2017—(DE) Office Action—App. 11 2009 00 596.9 with English Translation.

May 22, 2020—Office Action issued for DE 11 2009 000 596.9.

* cited by examiner

USER ACTION REMOTE CONTROL

RELATED APPLICATIONS

This application is a continuation of co-pending, U.S. patent application Ser. No. 12/051,618, filed Mar. 19, 2008, entitled User Action Remote Control, issued as U.S. Pat. No. 9,513,718 on Dec. 6, 2016, the disclosure of which is hereby incorporated by reference in its entirety.

BACKGROUND OF THE INVENTION

Remote controllers for video and audio devices and home appliances are very popular. Remote controllers typically use a using key pad for input. With newly developed touch technologies, input may be entered through a touch pad with a sliding or circular input. However, end users still need to control the device with the user's fingers. Moreover, having a dedicated remote controller for each controlled device is not desirable when there are a plurality of controlled devices. Consequently, a remote controller often controls a plurality of devices.

There is a real market need to facilitate controlling a plurality of controlled devices through a remote controller by a user.

SUMMARY OF THE INVENTION

The present invention provides methods, computer readable media, and apparatuses for remotely controlling a plurality of controlled devices. With three dimensional accelerometer components, detection of a user action on a remote controller and the orientation of the remote controller are viable through small electronic devices. Aspects of the invention are based on the three dimensional accelerometer components to design a remote controller that can detect the action of the user, e.g., flipping up, down, or rotating the remote controller. Based on the user action, the remote controller transmits a signal to the controlled device which conveys the corresponding command. Targeted controlled devices include, but are not limit to, window blinds, window shades, projector screens, lighting fixtures, fans, air-conditioning systems, audio and video equipment.

With another aspect of the invention, a remote controller senses motion on the remote controller through an accelerometer. Accelerometer information is processed to determine the orientation of the remote controller in order to control a selected controlled device from a plurality of controlled devices. Also, user actions on the remote controller are determined from the accelerometer information. A user action is converted to a command, and a signal is transmitted to the selected device that conveys the command.

With another aspect of the invention, a user action is matched to a plurality of predetermined actions. The matched action is mapped to the corresponding command.

With another aspect of the invention, a selected controlled device is matched to the remote controller. The selected controlled device may be matched through preprogramming or by a user pressing a match key on the controlled device.

With another aspect of the invention, a remote controller and controlled device support a learning mode. The controlled device sends the remote controller a list of supported commands. The remote controller than matches an associated action with each command in the command list.

With another aspect of the invention, when a remote controller is essentially stationary, the remote controller enters a standby mode in order to reduce power consumption.

BRIEF DESCRIPTION OF THE DRAWINGS

The foregoing summary of the invention, as well as the following detailed description of exemplary embodiments of the invention, is better understood when read in conjunction with the accompanying drawings, which are included by way of example, and not by way of limitation with regard to the claimed invention.

DETAILED DESCRIPTION

With three dimensional accelerometer components, detection of action and orientation are viable through small electronic devices. Aspects of the invention are based on the three dimensional accelerometer components to provide a remote control that can detect the action of the user, e.g., flipping up, down, or rotating the remote controller. Based on the user action, the remote controller transmits a signal to the controlled device to convey the corresponding command. Controlled devices include, but are not limited to, window blinds, window shades, projector screens, lighting fixtures, fans, air-conditioning systems, and audio and video (A/V) equipment.

Figure 1:
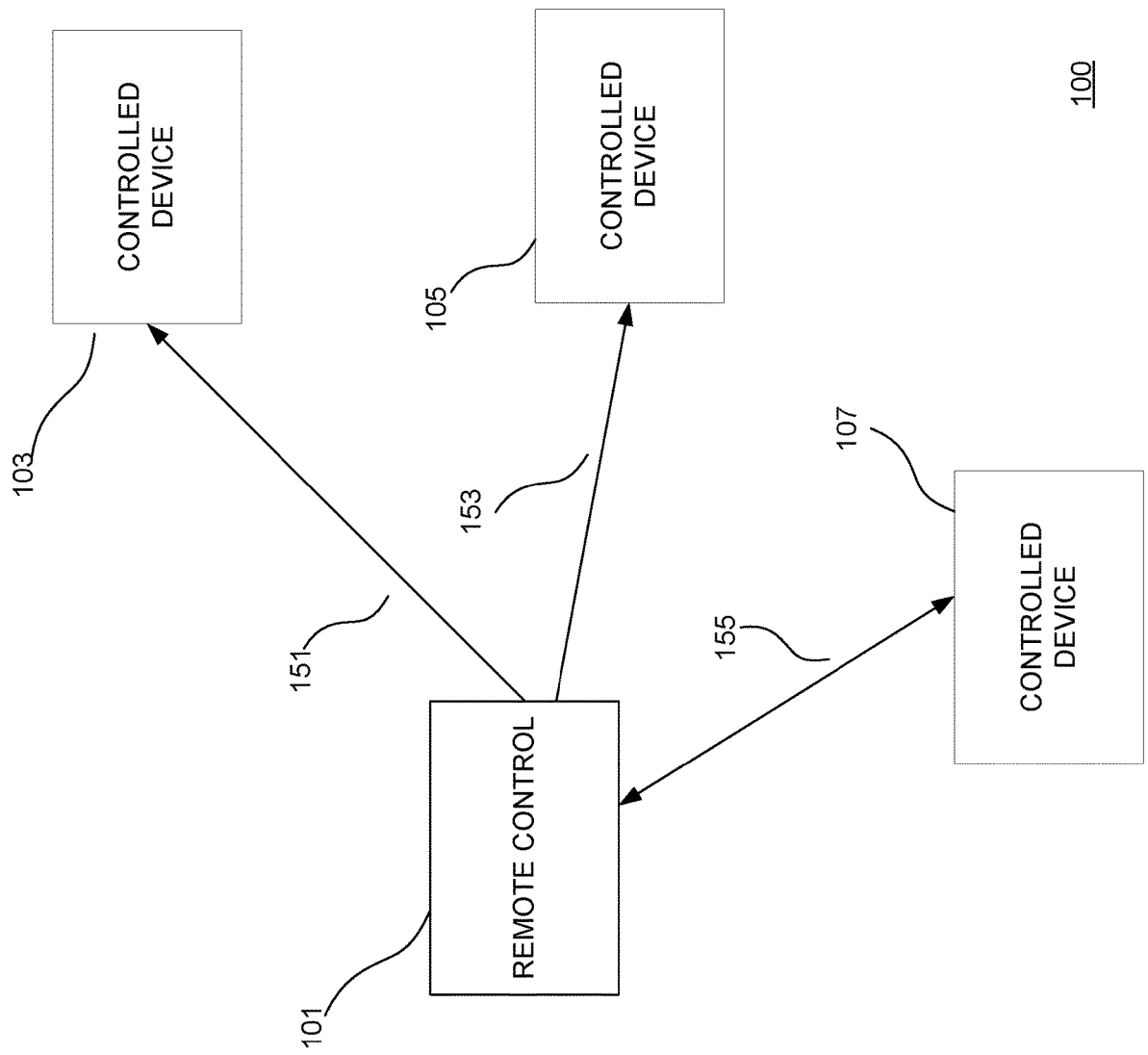
FIG. 1 shows a remote controller controlling a plurality of controlled devices in accordance with an embodiment of the invention.

FIG. 1 shows system 100 in which remote controller 101 controls a plurality of controlled devices (e.g., controlled devices 103-107) in accordance with an embodiment of the invention. Controlled devices may be different types of devices, including a television, window blinds, lighting fixture, audio/visual equipment, and heating/air-conditioning (HVAC) system.

With an embodiment of the invention, remote controller 101 sends signals to controlled devices 103-107 over communications channels 151-153, respectively. As shown in the exemplary embodiment in FIG. 1, communications channels 151-153 are one-way (from remote controller 101 to controlled device 103 or 105) so that a command can be conveyed to the controlled device. Moreover, communications channel 155 is two-way so that controlled device 107 can also send configuration information (e.g., the command list supported by the controlled device) to remote controller 101 as will be further discussed.

Figure 2:
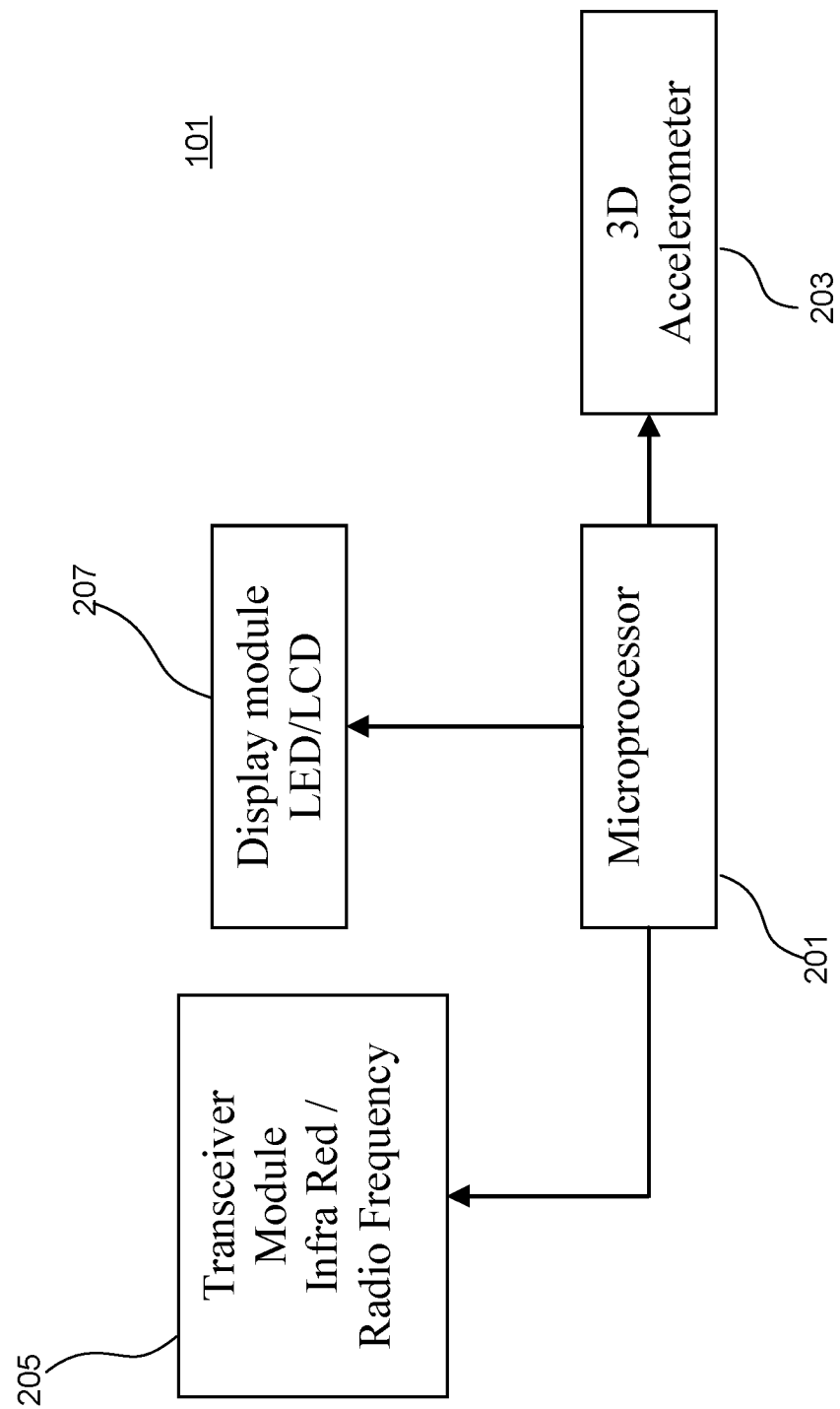
FIG. 2 shows a block diagram of a remote controller in accordance with an embodiment of the invention.

FIG. 2 shows block diagram 200 of remote controller 101 in accordance with an embodiment of the invention. Remote controller 101 includes processor 201 that obtains accelerometer information from accelerometer 203. Processor 201 processes the accelerometer information to determine the orientation of remote controller 101 and to determine the user action (e.g., linearly up, linearly down, or circular) that is imposed on remote controller 101. The user action is subsequently mapped to a predetermined action, which corresponds to a command for the controlled device. Processor 201 then instructs transceiver 205 to transmit a signal, which contains command information, to the controlled device.

Remote controller 101 recognizes an action from the end user that is applied to the remote controller. Exemplary actions that can be detected from accelerometer 203 include:

up swing
up swing with return
down swing
down swing with return
left swing
left swing with return
right swing
right swing with return
clockwise circle
anti-clockwise circle
slant up from left to right
slant up from right to left
slant down from left to right
slant down from right to left The user action is mapped to a predefined action, which corresponds to a command. For example, remote controller 101 may command a television to change to the next channel when moved with an up swing with a return movement.

Referring to FIG. 1, remote controller 101 may control a plurality of controlled devices. An output signal from remote controller 101 can match a command with a user action recognized for different devices. For example, when controlling the light level of electric lamp, the user swings remote controller 101 up or up with return. The action matches with the light level up command. The light level of the lamp consequently will increase. The level can also be proportional to the acceleration of the swing movement by the user. The faster the acceleration, the brighter will be the level. When the user swings remote controller 101 down or down with return, the light level dims according to the acceleration detected.

The user can swing remote controller 101 upward or up with a return movement in order to move the window blinds upward. Remote controller 101 consequently sends a signal to the window blinds with a contained command to move the blinds upward. In order to stop the upward action, the user can impose a clockwise or anti-clockwise circular motion on remote controller 101.

Transceiver 205 may operate at different frequencies, corresponding to radio frequency, infrared, and visible light. Transceiver 205 typically comprises a transmitter portion and a receiver portion that operate from a common frequency source so that the transmit frequency and the receive frequency are related by a constant frequency offset. If only one-way communication is supported, transceiver 205 may be replaced with a transmitter without a corresponding receiver.

Processor 201 may utilize display 207 to indicate the selected controlled device being controlled for the corresponding orientation of remote controller 101. For example, in the vertical position, remote controller 101 may control a fan, while in the vertical position remote controller 101 may control a lighting system.

When remote controller 101 is resting at a predefined orientation, e.g., horizontal or vertical, remote controller 101 enters the standby or sleep mode to reduce battery consumption. Based on the application and the characteristics of a typical user, one can experimentally determine an acceleration threshold below which remote controller 101 is considered essentially stationary. Also, when remote controller 101 is positioned at a certain orientation for long time, remote controller 101 may enter into the standby or sleep mode.

Referring to FIG. 1, one approach for matching the devices 103-107 and remote controller 101 is through pre-programming in remote controller 101 and controlled devices 103-107.

Another approach is to use two-way transceiver for both remote controller 101 and controlled devices 103-107. An input key at a controlled device can be used as a matching key. When the matching key of a selected controlled device is pressed by the user, remote controller 101 can be moved to the corresponding orientation and swing with a predefined pattern, e.g., Up→Down→Up→Down→Up for confirming with the device.

The selected controlled device can have at least one key as the "Matching" key to match the orientation of the remote to the device. With other embodiments, an additional "Learning" key is needed to enter both the selected controlled device and remote controller 101 into the learning mode. In the learning mode, remote controller 101 receives the command list from the selected controller device. The user is consequently instructed to perform appropriate actions for learning.

When remote controller 101 receives the command from the selected controlled device with a list of commands for learning corresponding actions, remote controller 101 enters into the action learning mode. The corresponding command may be displayed either on a light emitting diode (LED) indicator or a liquid crystal display (LCD). The end user can teach remote controller 101 different actions in order to control the selected controlled device.

Figure 3:
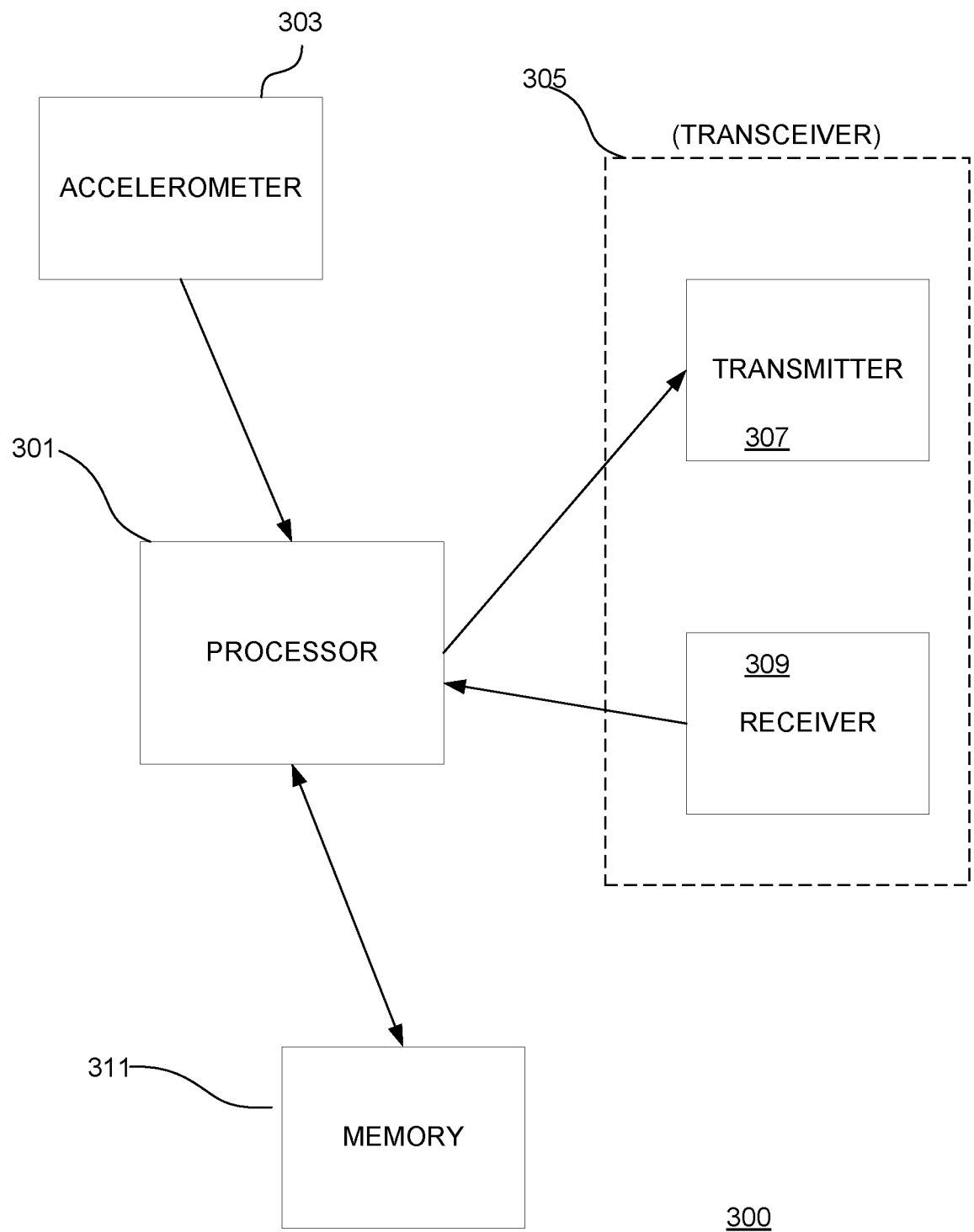
FIG. 3 shows a block diagram of a remote controller in accordance with an embodiment of the invention.

FIG. 3 shows a block diagram 300 of remote controller 101 in accordance with an embodiment of the invention. Processor 301 receives accelerometer information from accelerometer 303. Processor 301 processes the accelerometer information in accordance with computer-executable instructions from memory 311. Memory 311 may include different forms of computer-readable media that can be accessed by processor 301. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

When processor 301 determines the user action imposed on remote controller 101, processor 301 then converts the user action into a command and inserts the command in the signal sent to the controlled device through transceiver 305. Transceiver 305 includes both transmitter 307 and receiver 309. However, if only one-way communication is supported, transceiver 305 may be replaced with transmitter 307.

Figure 4:
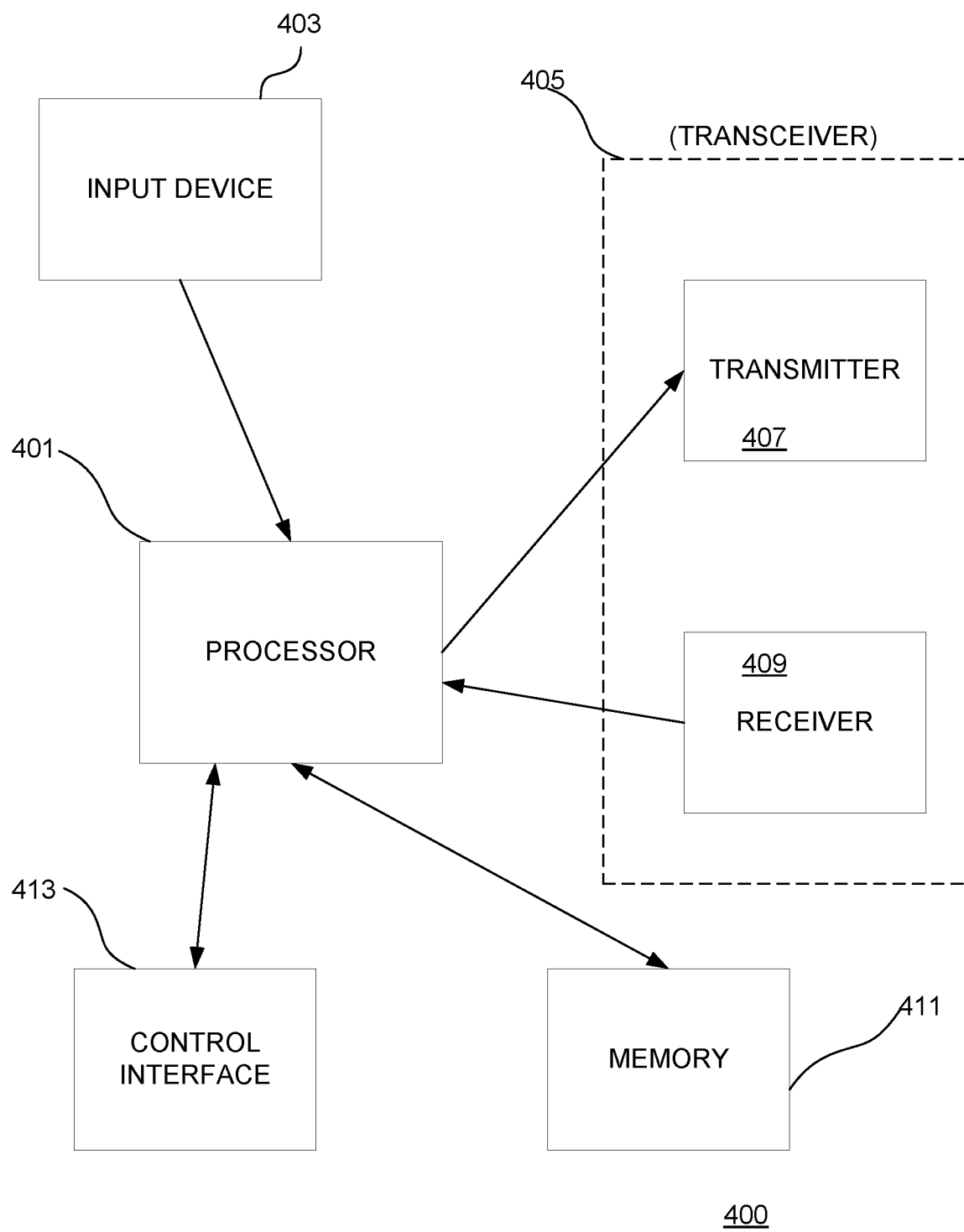
FIG. 4 shows a block diagram of a controlled device in accordance with an embodiment of the invention.

FIG. 4 shows block diagram 400 of a controlled device (e.g. controlled device 107) in accordance with an embodiment of the invention. Processor 401 receives a signal through transceiver 405 in order to control the controlled device. Transceiver 405 includes both transmitter 407 and receiver 409. However, if only one-way communication is supported in which the controlled device only receives a signal from controlled device 101, then transceiver 405 may be replaced with receiver 409.

Once processor 401 determines the command from the received signal, processor 401 instructs the controlled device to execute the command through control interface 413. For example, processor 401 may instruct a lighting fixture to increase the level of intensity by increasing the duty cycle of the provided power signal to a light.

The controlled device may also include input device 403 to provide a key input when matching the controlled device to remote controller 101 or to support the learning mode.

Processor 401 processes the signal from transceiver 405 in accordance with computer-executable instructions from memory 411. Memory 411 may include different forms of computer-readable media that can be accessed by processor 401. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Figure 5:
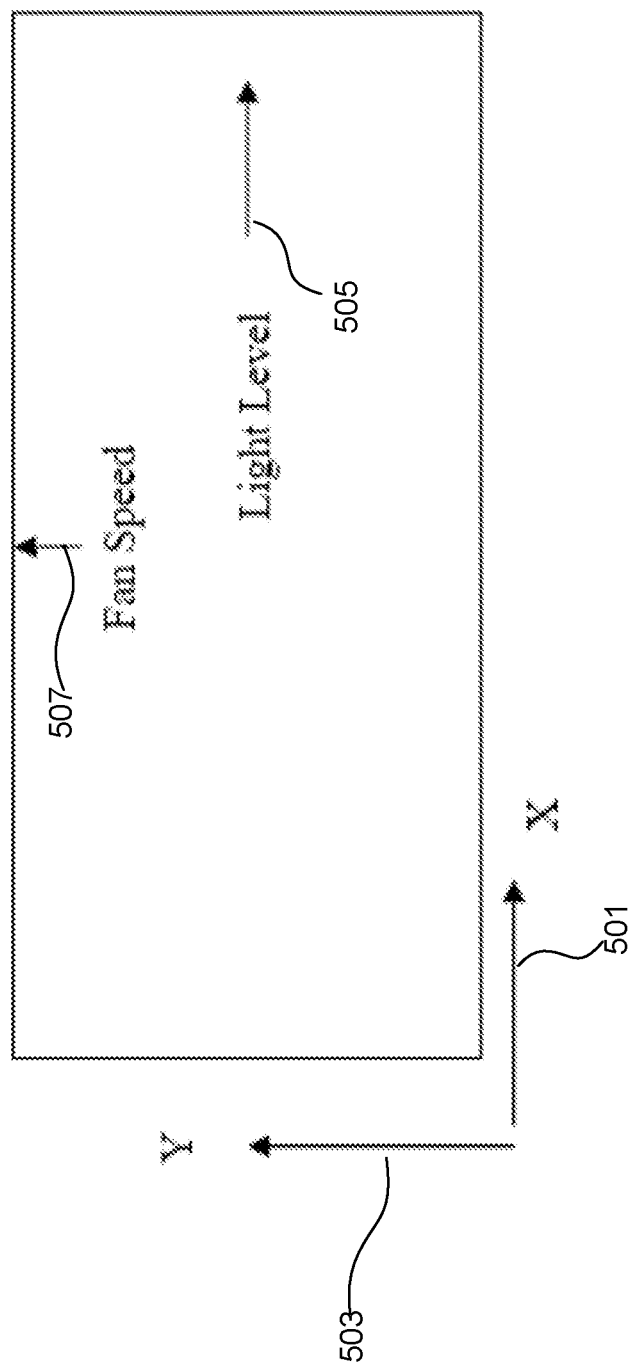
FIG. 5 shows different user actions that may be imposed on a remote controller to control different controlled devices in accordance with an embodiment of the invention.

FIG. 5 shows different user actions that may be imposed on remote controller 500 to control different controlled devices in accordance with an embodiment of the invention. Remote controller 500 may assume different physical shapes including a square, rectangle, circular, eclipse, or sphere. The user can rotate remote control 500 to a predefined orientation in order to control a controlled device from a plurality of controlled devices. For example, for rectangle remote control 500 as shown in FIG. 5: When remote controller 500 is lifted with Y direction 503 upward, remote controller 500 is used to control the fan speed of a fan. When remote controller 500 is lifted with X direction 501 upward, remote controller 500 is used to control light level 505.

Figure 6:
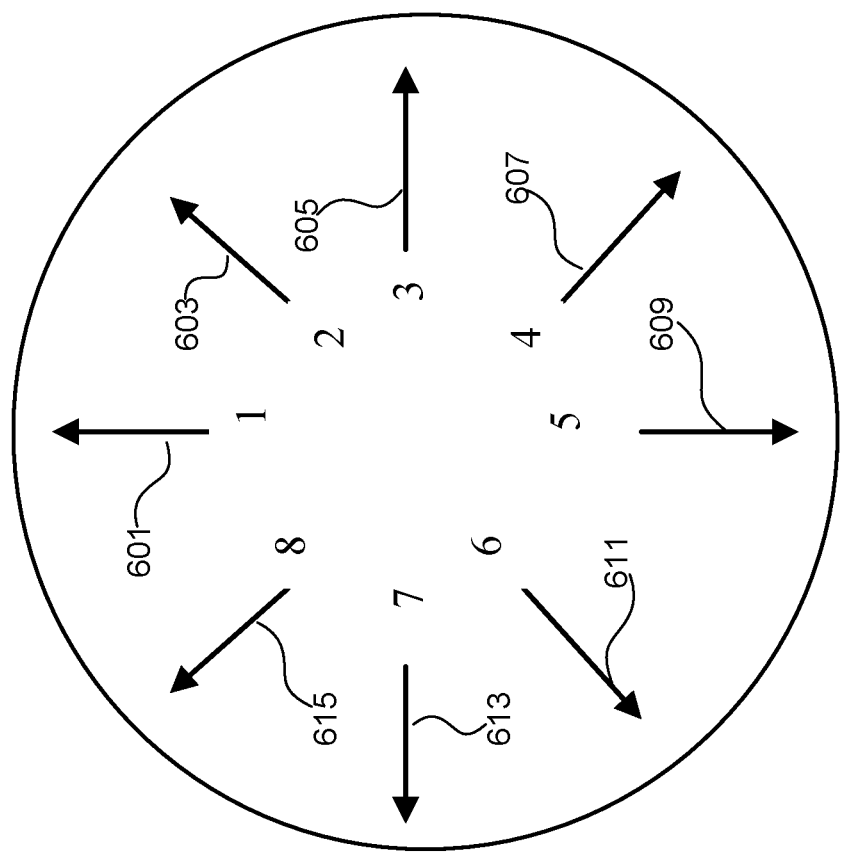
FIG. 6 shows different user actions that may be imposed on a remote controller to control different groups of lighting devices in accordance with an embodiment of the invention.

FIG. 6 shows different user actions that may be imposed on remote controller 600 to control different groups of lighting devices in accordance with an embodiment of the invention. Remote controller 600 has a circular shape remote control for multiple lighting controls based on orientations 601-615. Remote controller 600 can control eight sets/groups of the lighting in any location. For example, when remote controller 600 is rotated with arrow 4 pointing upward (corresponding to orientation 607, group 4 lighting can be controlled by remote controller 600. In order to control another group of lighting, the user can simply rotate remote controller 600 with the corresponding orientation pointing upward.

A corresponding indicator (e.g., LED display or LCD 207 as shown in FIG. 2) may be used to indicate which device or device group that remote controller 600 is currently controlling as feedback to the end user.

Referring to FIG. 2, accelerometer 203 may provide accelerometer information to three dimensions (X, Y, and Z). Consequently, remote controller 101 can control numerous controller devices.

Figure 7:
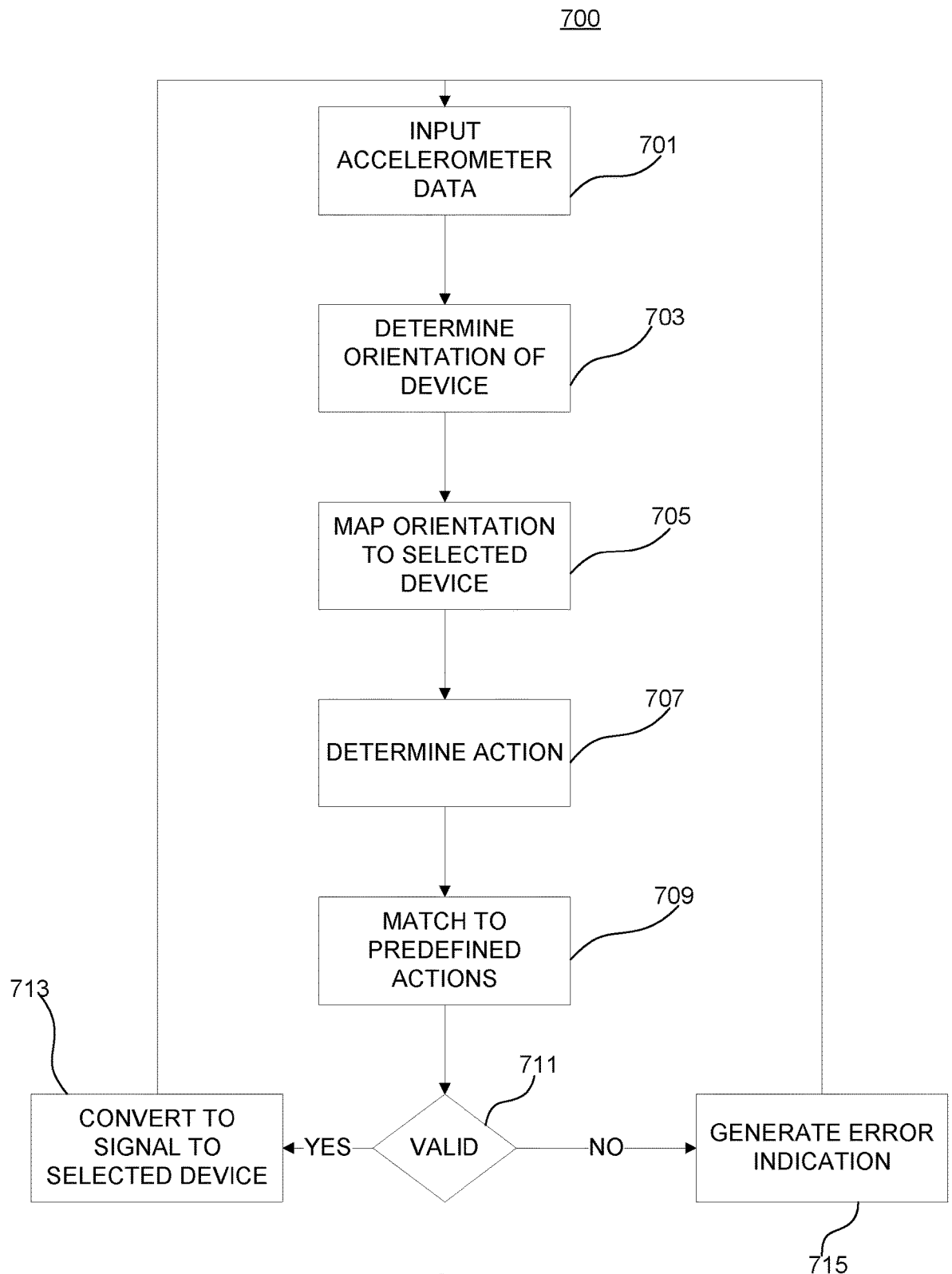
FIG. 7 shows a flow diagram for a remote controller in accordance with an embodiment of the invention.

FIG. 7 shows flow diagram 700 for a remote controller in accordance with an embodiment of the invention. In step 701, accelerometer information is obtained from accelerometer 203 (referring to FIG. 2). From the accelerometer information, processor 101 determines the orientation of the remote controller (e.g., whether the remote controller is positioned with vertically or horizontally) in step 703. The selected controlled device is determined from the orientation in step 705. If the user has imposed an action on the controlled device (e.g., moving the remote controller up or circularly), processor 201 determines the type of user action in step 707. Processor 201 compares the user action to the set of predefined actions and determines the corresponding predefined action in step 709. The following Table illustrates a set of predefined actions. If the user action matches one of the predefined actions in step 711, processor 201 converts the user action to the corresponding command and inserts the command in a signal that is transmitted to the selected controlled device in step 713. If the user action does not match one of the predefined actions in step 711, then processor 201 generates an error indication on display 207 in step 715. (For example, if the user action is slant up left to right when controlling the window blinds, then the user action is deemed to be in error.) Alternatively, processor 201 may ignore the user command and wait for the next valid user command.

TABLE

MAPPING OF USER ACTIONS TO COMMANDS

| Predefined Action | Controlled Device | Command |
| --- | --- | --- |
| Up swing | Television | Power on |
| Down swing | Television | Power off |
| Right swing | Television | Channel up |
| Left swing | Television | Channel down |
| Clockwise circle | Television | Volume up |
| Counter-clockwise circle | Television | Volume down |
| Slant up left to right | Television | Mute |
| Slant down right to left | Television | Unmute |
| Up swing with return | Window blinds | Open blinds |
| Up swing | Window blinds | Open blinds |
| Down swing with return | Window blinds | Close blinds |
| Down swing | Window blinds | Close blinds |
| Clockwise circle | Window blinds | Stop motion of blinds |
| Counter-clockwise circle | Window blinds | Stop motion of blinds |

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   determining, by a remote control, an orientation of the remote control from among a plurality of predefined orientations comprising a first orientation where an X-axis of the remote control is facing upward relative to ground;
   after the determining of the orientation, affirmatively selecting, by the remote control based on the orientation of the remote control, a device from among a plurality of devices with which to establish wireless communication with the remote control, wherein each of the plurality of devices correspond to a predefined orientation of the remote control, and wherein each of the plurality of devices correspond to a mapping of motions of the remote control to commands for the selected device;

receiving, by the remote control, an indication of a motion of the remote control;

determining, based on the mapping of the motion of the remote control corresponding to the selected device and the indication of the motion of the remote control, a command for the selected device from among the commands for the selected device in the mapping, wherein the command determined for the selected device is different than a corresponding command for another device from among the plurality of devices even when the motion of the remote control is the same; and transmitting, by the remote control to the selected device, the command, wherein a destination of the determined command is changed when the orientation of the remote control is changed.

2. The method of claim 1, wherein determining the command is further based on a direction of the motion, and wherein the orientation of the remote control is one of vertical and horizontal.

3. The method of claim 1, wherein the indication of the motion of the remote control is received from an accelerometer associated with the remote control.

4. The method of claim 1, wherein transmitting the command is performed via one or more of: infrared or radio frequency.

5. The method of claim 1, wherein the command is associated with one or more of: a volume of the device, a channel displayed by the device, or a light level of the device.

6. The method of claim 1, wherein the remote control comprises one or more input keys, and wherein determining the command for the device is further based on a first input key of the one or more input keys being pressed.

7. The method of claim 1, wherein the motion comprises a rotation of the remote control.

8. A method involving a hand-held device, a first device, and a second device, the method comprising:

determining, by an accelerometer associated with the hand-held device, an orientation of the hand-held device from among a plurality of predefined orientations comprising a first orientation where an X-axis of the hand-held device is facing upward relative to ground;

receiving, from the accelerometer associated with the hand-held device, an indication of a motion of the hand-held device, wherein the motion is in a direction;

after the determining of the orientation, affirmatively selecting, by the hand-held device, the second device from among the first device and the second device based on the orientation of the hand-held device, wherein the second device corresponds to a mapping of motions of the hand-held device to commands for the second device, and the first device corresponds to a different mapping of motions of the hand-held device to commands for the first device;

determining, based on the mapping of motions of the hand-held device for the second device, a command for the second device for the direction of the motion, wherein the command determined for the selected second device is different than a corresponding command for the first device for the same direction of the motion; and transmitting, to the second device, the command, wherein a selected device is changed from the second device to the first device when the orientation is changed.

9. The method of claim 8, wherein the orientation of the hand-held device is one of vertical and horizontal.

10. The method of claim 8, wherein transmitting the command is performed via one or more of: infrared or radio frequency.

11. The method of claim 8, wherein the command is associated with one or more of: a volume of the second device, a channel displayed by the second device, or a light level of the second device.

12. The method of claim 8, wherein the hand-held device comprises one or more input keys, and wherein determining the command for the second device is further based on a first input key of the one or more input keys being pressed.

13. The method of claim 8, wherein the motion comprises a rotation of the hand-held device, and wherein determining the command is further based on the rotation.

14. A remote control comprising:

one or more processors, and memory storing instructions that, when executed by the one or more processors, cause the remote control to:

determine an orientation of the remote control from among a plurality of predefined orientations;

receive, via an accelerometer, an indication of a motion of the remote control;

after the determining of the orientation, automatically select by the remote control, based on the orientation detected by the remote control, a device from among a plurality of devices, wherein each of the plurality of devices correspond to a predefined orientation of the remote control, and wherein the selected device corresponds to a mapping of motions of the remote control to commands for the selected device, and wherein another device among the plurality of devices corresponds to a different mapping of motions of the hand-held device to commands to the other device;

determine, based on the mapping of the motions of the remote control for the selected device, a command for the selected device for the received motion of the remote control, wherein the command is different when the selected device is different even if the motion is the same; and transmit, to the selected device, the command.

15. The remote control of claim 14, wherein the predefined orientations of the hand-held device comprise vertical and horizontal.

16. The remote control of claim 15, wherein the selected device is changed from a first device to a second device of the plurality of devices when the orientation is changed.

17. The remote control of claim 14, wherein transmitting the command is performed via one or more of: infrared or radio frequency.

18. The remote control of claim 14, wherein the command for the device is associated with one or more of: a volume of the device, a channel displayed by the device, or a light level of the device.

19. The remote control of claim 14, wherein the remote control comprises one or more input keys, and wherein determining the command for the device is further based on a first input key of the one or more input keys being pressed.

20. The remote control of claim 14, wherein the motion comprises a rotation of the remote control, and wherein determining the command for the device is further based on the rotation.

* * * * *